Patented May 1, 1928.

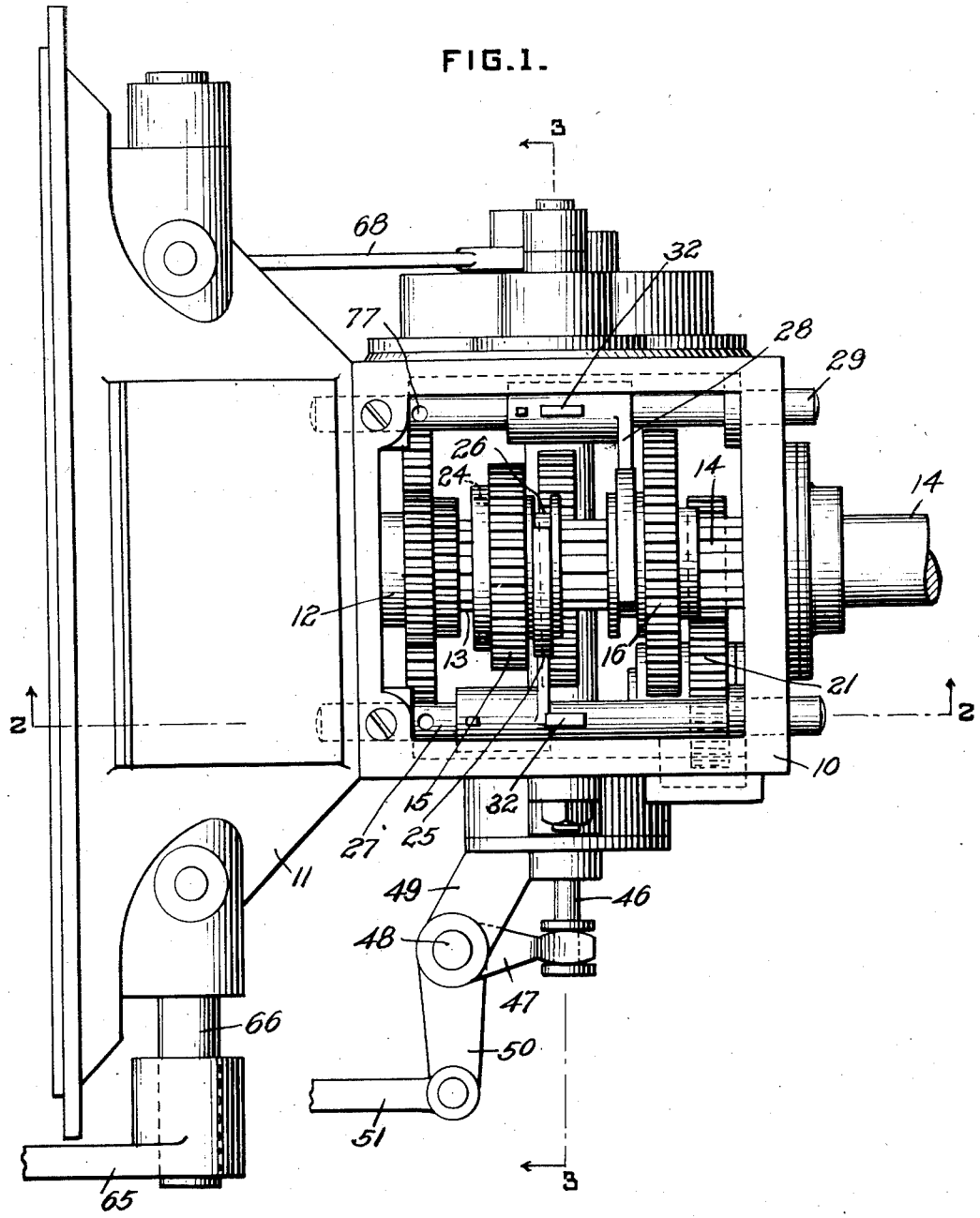

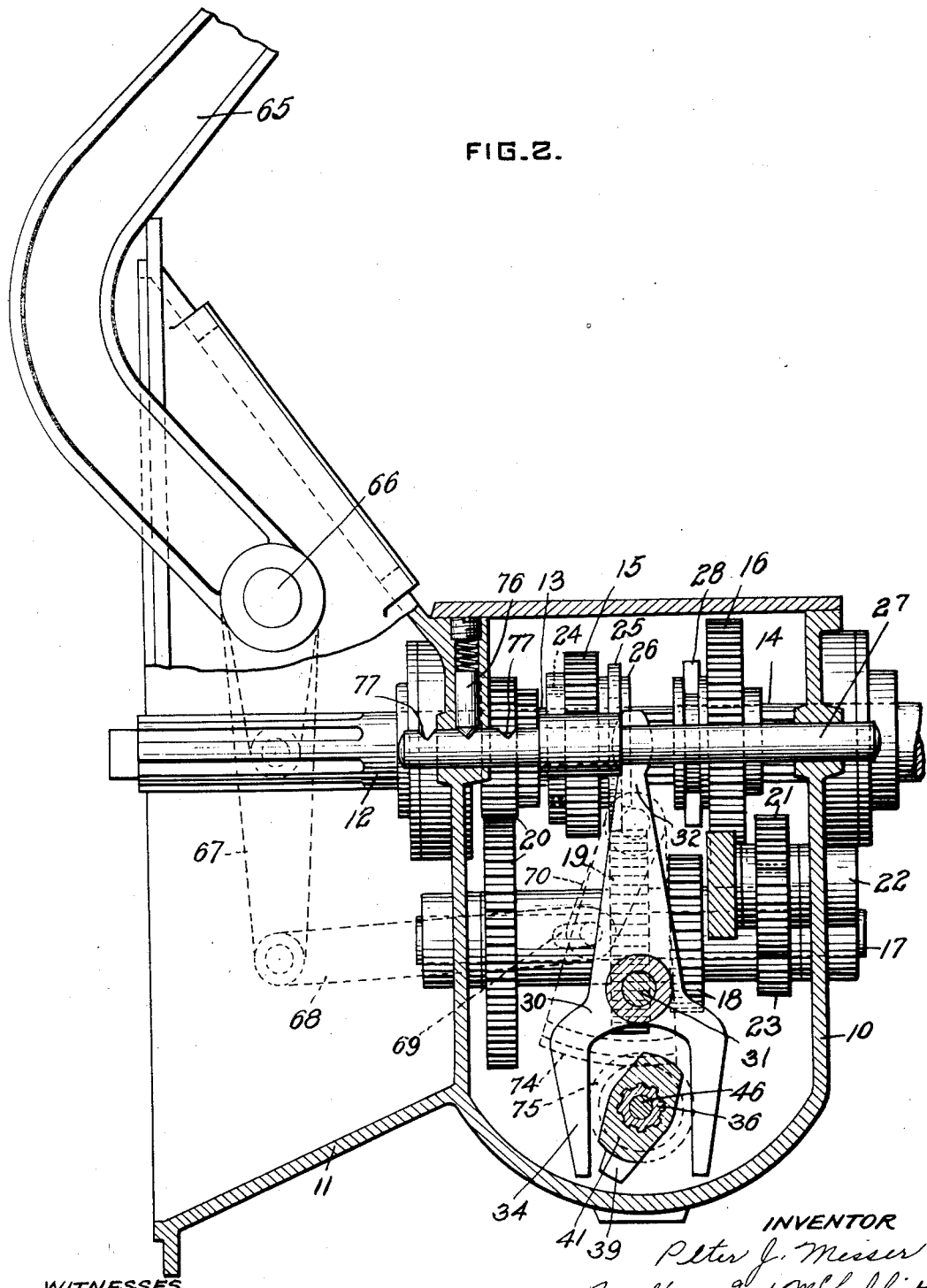

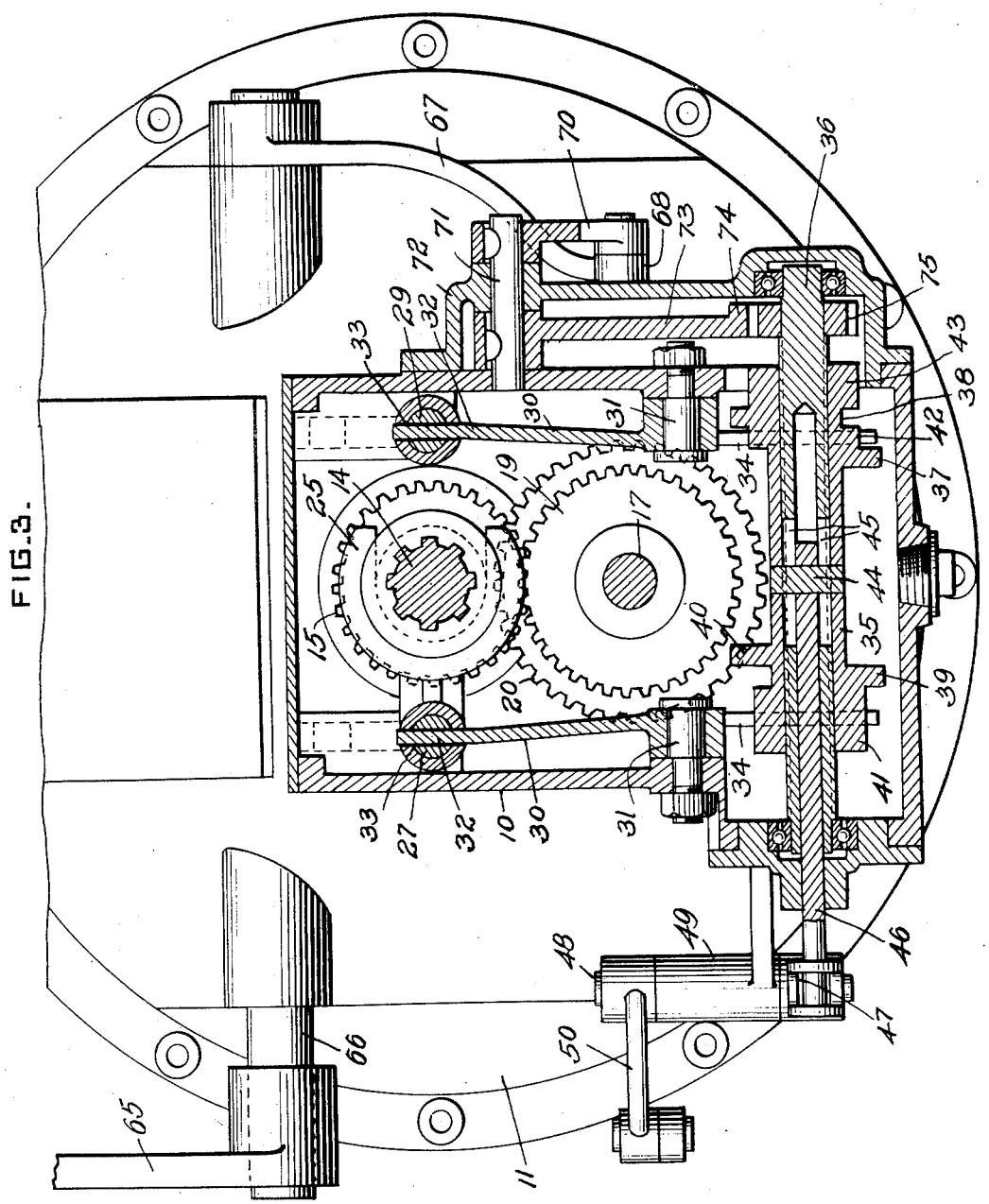

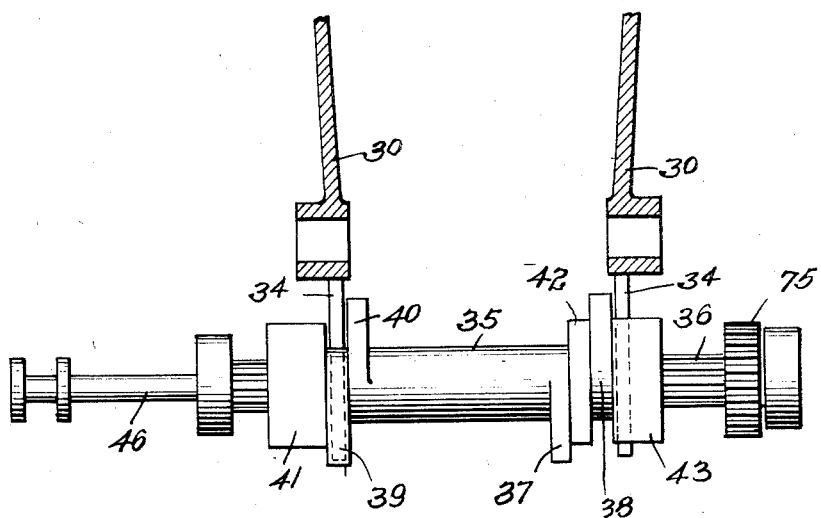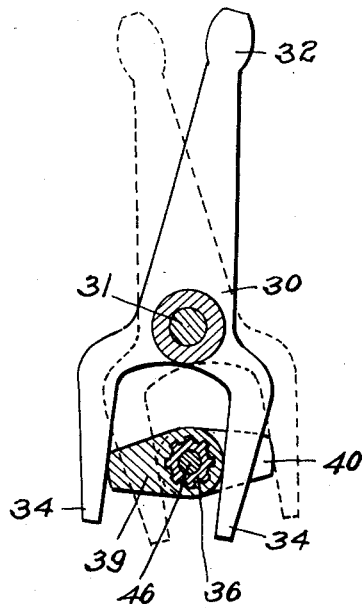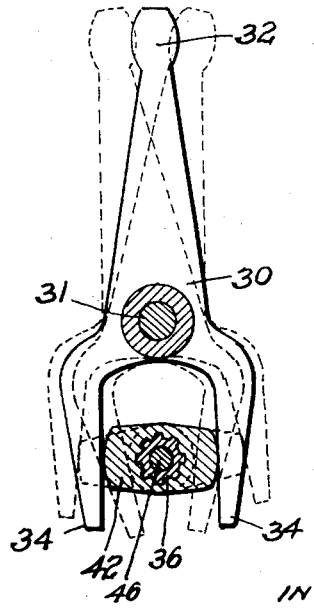

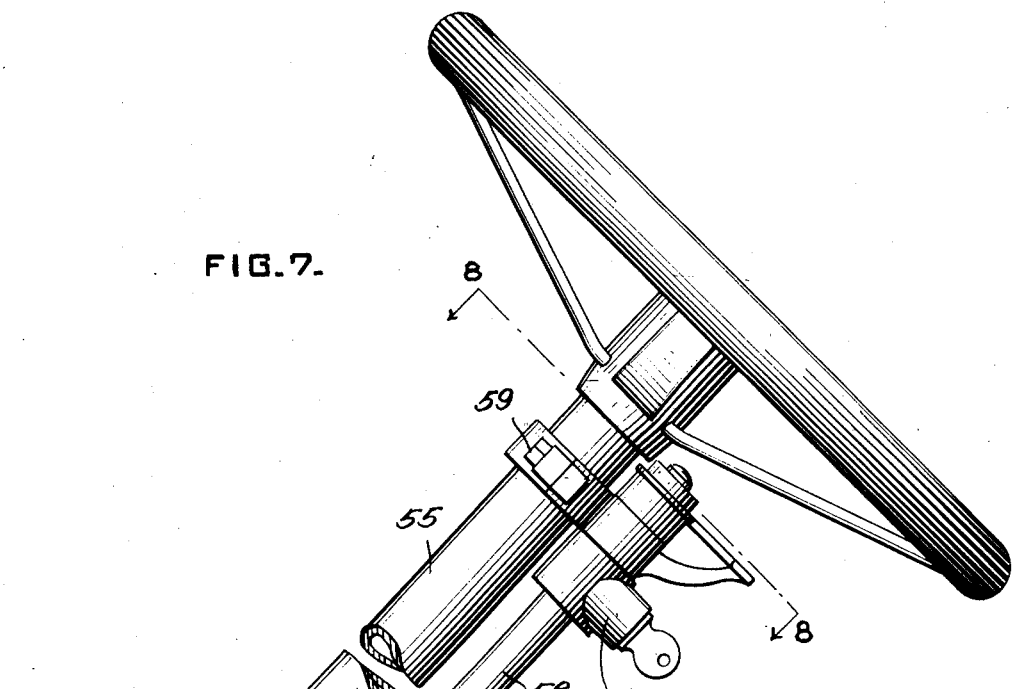
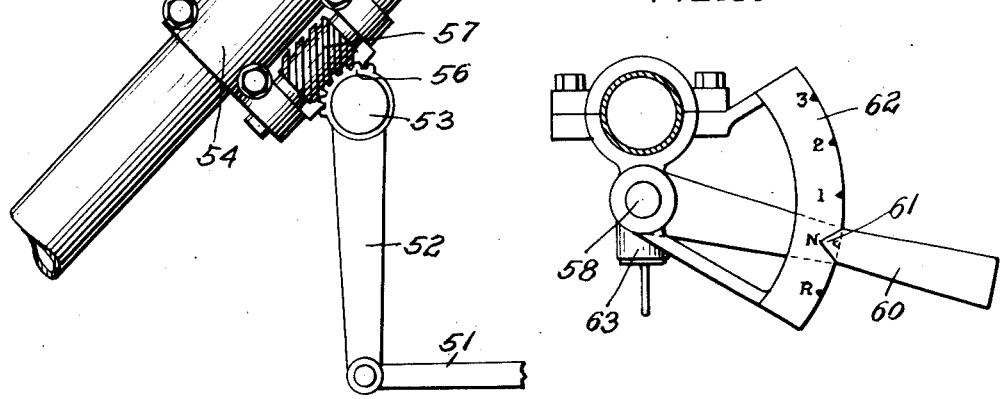

1,668,215

UNITED STATES PATENT OFFICE.

PETER J. MESSER, OF OLEAN, NEW YORK, ASSIGNOR TO MESSEAR ENGINEERING CORPORATION, A CORPORATION OF NEW YORK.

AUTOMATIC GEAR-SHIFTING MECHANISM.

Application filed November 27, 1925. Serial No. 71,549.

This invention relates to transmissions such as are commonly embodied in motor cars for connecting the crank shaft of the motor with the drive shaft of the car through different gears so as to vary the relative speeds of the car and motor. It relates more particularly to sliding gear transmissions of the automatic type wherein the shifting of the gears is accomplished without the use of a manually operated shift lever.

Various forms of mechanisms have been provided for accomplishing this result but all such as are known to me have embodied a relatively large number of parts which have necessarily been located outside of the regular transmission box or housing. Such constructions are not only impractical but cannot be used under present day methods of manufacture wherein the motor, clutch and transmission are embodied into a unitary power plant having the transmission housing bolted directly to the clutch housing.

An object of this invention is to provide an automatic transmission of such construction that the gear shifting mechanism is compactly arranged as an integral part of the transmission assembly within the transmission housing.

A further object is to provide a mechanism of the type set forth constructed and arranged to permit the driver of the vehicle to control the shifting mechanism so as to place the gears in predetermined relation by movement of the usual clutch pedal.

A still further object is to provide a mechanism of the type set forth which will be simple, compact and rugged in construction, positive in operation and cheap to manufacture and assemble.

These and other objects which will be obvious to those skilled in this particular art are attained by means of this invention, one embodiment of which is illustrated in the accompanying drawings wherein Figure 1 is a top plan view of an automobile transmission provided with an automatic shifting mechanism constructed in accordance with one form of this invention, the cover plate of the transmission housing being removed. Fig. 2 is a vertical transverse section on the line 2—2 of Fig. 1. Fig. 3 is a vertical cross section on the line 3—3 of Fig. 1. Fig. 4 is a view similar to Fig. 3 showing certain of the details in elevation. Figs. 5 and 6 are views in elevation of the gear shifting yokes illustrating the means for operating the same. Fig. 7 is an elevation of the steering post of a motor vehicle showing the mechanism for controlling the operation of the gear shift mechanism and Fig. 8 is a view of a detail thereof taken on the line 8—8 of Fig. 7.

The particular embodiment of this invention which has been chosen for the purposes of illustration is shown as applied to the usual form of sliding gear transmission which is mounted in a housing bolted directly to the clutch casing of a power plant so as to form a unit therewith. As usual, one of the sliding gears is adapted to be shifted so as to drive the vehicle in either reverse or low, while another sliding gear is adapted to be shifted so as to drive the vehicle in either second or high, the latter being, of course, a direct drive. A sliding shaft is mounted in one side of the transmission housing and is connected to the first sliding gear by a collar and a similar shaft is mounted in the other side of the housing and is connected to the second sliding gear by a similar collar. Movement of the slide shafts will shift the gears so as to provide the desired drive or to position the gears in neutral. A shift yoke is pivoted on each side of the housing and is connected to the associated sliding rod and shift collar for operating the same, and a cam shaft extends transversely across the bottom of the housing and is slidable transversely thereof so as to position the desired cam surface in operative relation to the associated shift yoke. The shaft is adapted to be rotated by operation of the clutch pedal, and the position of the shaft with relation to the shift yokes will operate the latter so as to shift the sliding gears and provide a predetermined connection.

As illustrated, the invention is applied to a transmission mounted within the usual housing 10 which is secured directly to a clutch casing 11 in any desired manner. A drive shaft 12 extends into the housing through the front wall thereof from an associated clutch and the usual gear teeth 13 are provided on the inner end of the shaft. A driven shaft 14 extends rearwardly through the back of the housing and sliding gears 15 and 16 are splined to the driven shaft 14. A counter shaft 17 is mounted in the housing in parallel relation to the driving shaft 12 and the driven shaft 14. Low gear 18 and second gear 19 are supported upon the counter shaft and are continuously rotated from the drive shaft 12 by means of constant mesh gears 20. A reverse gear 21 is mounted upon a stub shaft 22 and is driven by a gear 23 upon the counter shaft and meshing with the reverse gear. The sliding gear 15 upon the driven shaft is provided with internal gear teeth 24 which are adapted to mesh with the gear teeth 13 on the inner end of the drive shaft 12 so as to provide a direct drive in high. When the gear 15 is moved along the driven shaft 14 so as to mesh with the intermediate driving gear 19 on the counter shaft the vehicle will then be driven in second or intermediate gear. The sliding gear 16 is adapted to mesh with the low driving gear 18 on the counter shaft or with reverse gear 21 on the stub shaft so as to provide these respective drives. Of course, when one or the other of the sliding gears is in driving connection the other of the sliding gears is positioned in neutral or out of mesh with its associated connections. The hereinbefore described mechanism is well known in the art.

The sliding gear 15 is adapted to be shifted longitudinally of the driven shaft by a shift collar 25 engaging a groove 26 formed in the hub of the gear and secured to a sliding rod 27, the ends of which are slidably supported in the walls of the transmission housing, and the sliding gear 16 is adapted to be shifted by a similar shift collar 28 secured to a sliding rod 29 similar to the sliding rod 27 but mounted in the opposite side of the housing.

A gear shift yoke 30 is pivoted on each side of the transmission housing on a stub shaft 31, and each yoke is provided with an upwardly extending arm 32 received within slots 33 formed in the associated slide rods and shift collars whereby oscillation of the gear shifting yokes moves the associated gear shifting collars so as to slide the gears 15 and 16 into or out of mesh with the associated driving gears. Each yoke has downwardly extending, spaced arms 34 which straddle a hollow cam shaft 35 slidably keyed upon a hollow, rotatable shaft 36 extending transversely across the bottom of the housing between the downwardly depending arms of the gear shifting yokes. Yoke operating cams are formed on the cam shaft and consist of reverse gear cam 37, low gear cam 38, intermediate gear cam 39 and high gear cam 40 which are adapted to be positioned in operative relation to the gear shifting yokes so that rotation of the cam shaft will cause the yokes to be oscillated to provide a predetermined driving connection of the transmission gears. It will be observed that the cams 39 and 40 at the left of the cam shaft in Figs. 3 and 4 are oppositely disposed single throw cams and are adapted to oscillate the associated shift yoke 30 in one direction or the other so as to slide the forward gear 15 into engagement with the intermediate driving gear 19 when the yoke is moved in one direction or so as to engage the clutch teeth 13 and 24 to provide a direct drive in high when the yoke is moved in the other direction. When the yoke is positioned vertically the sliding gear 15 will be in its neutral position and out of mesh with both the direct driving gear teeth 13 and the intermediate driving gear 19. At the left hand end of the cam shaft in Figs. 3 and 4 adjacent the cams 39 and 40 for operating the sliding gears 15 is a double throw neutral cam 41 for oscillating the associated shift yoke so as to position the sliding gear 15 in neutral position when the cam shaft is so positioned as to move the adjacent gear shifting cams 37 out of operative relation with the associated shifting yoke. At the other end of the cam shaft in Figs. 3 and 4 the single throw gear shifting cams 37 and 38 are separated by a double throw neutral cam 42 and a second neutral cam 43 having a relatively broad surface is formed on the right hand end of the cam shaft 35. With this construction the reverse cam 37 and the low gear cam 38 are adapted to oscillate the associated gear shifting yoke 30 in one direction or the other so as to cause the gear shift collar 28 to move the sliding gear 16 into engagement with the reverse driving gear 21 or with low speed driving gear 18 and the double throw neutral cams 42 and 43 are adapted to operate the associated yoke so as to move it into neutral position with the sliding gear 16 out of engagement with its driving gears when the gear shifting cams at the other end of the cam shaft move the other sliding gear 15 into driving connection.

The cam shaft 35 is adapted to be moved longitudinally of the supporting hollow shaft 36 by means of a key 44, see Fig. 3, which is secured to the cam shaft and extends through elongated slots 45 formed in opposite sides of the hollow rotatable shaft 36. The key 44 is shifted longitudinally of the slots 45 so as to move the cam shaft 35 by a sliding shaft 46 within the hollow shaft 36 and extending outwardly through one side of the transmission housing.

Suitable mechanism is provided for moving the cam shifting rod 46 so as to provide the desired association of cam and shift yokes. In the present instance the outwardly extending end of the rod 46 is connected to a crank arm 47 secured to a vertically extending shaft 48 rotatably mounted in a bracket 49 on the side of the transmission housing. The upper end of the shaft 48 is provided with a crank arm 50 connected by a rod 51 to a second crank arm 52 which extends downwardly from a supporting shaft 53 rotatably mounted in a bracket 54 secured in any desired position such, for example, as on the steering post 55 of the vehicle. A geared segment 56 is formed on the upper end of the crank arm 52 and engages a worm 57 secured to the lower end of a shaft 58, the upper end of which is rotatably supported in a bracket 59 on the steering post. A lever 60 is secured to the shaft 58 and is provided with a pointer 61 or similar device for cooperating with a marked quadrant 62 determining position of the cam shaft 35. A lock 63 is provided for locking the mechanism against movement when the gears are set in neutral position.

After the lever 60 has been moved so as to position the cam shaft in the desired operative relation with the shifting yokes 30 the cam is rotated by movement of the clutch pedal 65 mounted on the usual clutch pedal shaft 66. A crank arm 67 on the clutch pedal shaft is connected by a link 68 through an adjustable pin and slot connection 69 to one end of a crank 70 keyed to a shaft 71 rotatably mounted in the side of the transmission housing above one end of the hollow shaft 36. One end of the shaft 71 is supported in the wall of the transmission housing while intermediate its ends it is rotatably supported in a bonnet 72 secured to the side of the housing and forming an enclosure for the adjacent end of the hollow supporting shaft 36 which is rotatably mounted therein. Within the bonnet 72 an arm 73 is keyed on the shaft 71 and is provided with a geared segment 74 meshing with a spur gear 75 secured to the shaft 36. Movement of the clutch lever will rotate the shaft 71 through the crank arms 67 and 70 and the connecting link 68 so as to move the geared segment 74 and rotate the cam supporting shaft 36.

Assuming the lever 60 to be in the neutral position illustrated in Fig. 8 the relative positions of the cams and shift yokes 30 will be that illustrated in Figs. 2 and 3. In starting the vehicle the lever is then moved so that its pointer coincides with the first or low speed mark on the quadrant 62. This moves the cam shaft 35 and the gear shifting cams from the position illustrated one step to the right at which time it will be seen that the low gear shifting cam 38 is in operative association with the adjacent shift yoke 30 while the other shift yoke still straddles the double throw neutral cam 41. By pushing the clutch pedal down the cam shaft 36 is rotated and the cam 38 oscillates the associated shift yoke 30 so as to move the sliding gear 16 into engagement with the low driving gear 18 and the vehicle will be driven through this connection when the clutch is let in by releasing the pedal. The backward movement of the pedal rotates the cams back to their original position but the yoke maintains its position with the gears in mesh as a result of a spring detent 76 which is adapted to engage notches 77 formed in the shift rods 27 and 29. To change into second the lever 60 is moved until the pointer 61 corresponds with the second gear mark on the quadrant and this movement shifts the cam shaft 35 longitudinally until the single throw intermediate gear cam 39 is in operative relation with the associated shift yoke 30 and such movement has positioned the double throw neutral cam 43 within the other shift yoke which is connected with the sliding gear 16 in mesh with the low driving gear 18. Operation of the clutch pedal will then cause the double throw neutral cam 43 to move the sliding gear 16 into neutral position, after which the single throw cam 39 moves the other shift yoke so as to slide the gear 15 into mesh with the intermediate driving gear 19. To shift into high the lever is again moved to the corresponding position on the quadrant and this places the single throw high gear cam 40 in operative relation with the associated shift yoke 30 while the double throw neutral cam 43 is of such length as to still hold the other shift yoke in neutral upright position. Operation of the clutch pedal will then cause the single throw cam 40 to oscillate the yoke 30 and slide the gear 15 until its internal driving teeth 24 engage the gear teeth 13 on the end of the drive shaft 12 at which time a direct drive is established between the motor and the shaft 14. The double throw neutral cams 41, 42 and 43 are so positioned and are of such size that they hold the associated shift yoke and its connected gear in neutral position whenever the opposite shift yoke is in gear engaging position, and the cams are so related that one gear is moved out of mesh before another gear is moved into mesh. The device is obviously simple and compact so that it can be embodied in a transmission housing slightly larger than the usual housings used with manually shifted transmissions. Elimination of the hand lever enables the top of the housing to be materially lower resulting in a lower positioning of the body of the vehicle.

The bonnet 72 which encloses the gear and segment is oil tight and enables the entire cam assembly to be easily withdrawn from the gear box when necessary.

Although I have described a specific embodiment of this invention I do not wish to be limited to the details thereof but

What I claim as new and desire to secure by Letters Patent is:

1. A unitary transmission and gear-shifting mechanism including a housing, a sliding-gear transmission within said housing, mechanism for shifting certain of said gears to vary the driving connections thereof, a shaft located in said housing below said mechanism, a plurality of cams supported on said shaft below said mechanism and movable into predetermined relation with said mechanism, one end of said shaft projecting beyond the wall of said housing, an operating gear secured to the projecting end of said shaft, a segment mounted upon said wall above said shaft and operatively engaging said gear, an enclosure for said gear and segment supported on said housing, and means for operating said segment.

2. The combination in a sliding gear transmission of a housing, collars for shifting the slidable gears of said transmission, a yoke pivoted on each side of said housing and operatively associated with the adjacent shift collar, a shaft rotatably mounted beneath said yokes, a plurality of cams supported by said shaft and adapted to oscillate said yokes to shift said gears, means for moving said cams axially of said shaft so as to position a predetermined cam in operative relation to each of said yokes and means for rotating said shaft and cams to provide a predetermined driving connection between said gears.

3. The combination in a sliding gear transmission of a housing, collars for shifting the slidable gears of said transmission, a yoke pivoted on each side of said housing and operatively associated with the adjacent shift collar, a shaft rotatably mounted beneath said yokes, a plurality of cams supported on said shaft and adapted to oscillate said yokes to shift said gears, means for moving said cams axially of said shaft so as to position a predetermined cam in operative relation in each of said yokes, a gear and segment for rotating said shaft and cams to provide a predetermined driving connection betwen said gears and means for operating said segment from a remote point.

4. The combination in a sliding gear transmission of a housing, collars for shifting the slidable gears of said transmission, means for actuating said collars so as to provide a predetermined driving connection, a hollow shaft rotatably mounted adjacent said actuating means, a cam shaft keyed to said hollow shaft and rotatable therewith so as to operate said actuating means, means extending longitudinally of said hollow shaft for shifting said cam shaft so as to position, a predetermined cam in operative relation to said actuating means and means for rotating said cam shaft so as to operate said actuating means.

In testimony whereof, I have hereunto subscribed my name this 23rd day of November, 1925.

PETER J. MESSER.